United States Patent
Messer et al.

(10) Patent No.: US 6,762,798 B1
(45) Date of Patent: Jul. 13, 2004

(54) METHODS AND APPARATUS FOR PROVIDING VIDEO CONTROL FOR TELEVISION APPLICATIONS

(75) Inventors: Keith L. Messer, Hayward, CA (US); Jesus David Rivas, San Francisco, CA (US); James Van Loo, Los Altos, CA (US); Tao Ye, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 521 days.

(21) Appl. No.: 09/614,277

(22) Filed: Jul. 12, 2000

Related U.S. Application Data (60) Provisional application No. 60/143,428, filed on Jul. 13, 1999, and provisional application No. 60/174,535, filed on Jan. 5, 2000.

(51) Int. Cl.$^7$ ................................................. H04N 5/45
(52) U.S. Cl. ........................ 348/565; 345/799; 345/801
(58) Field of Search ........................... 348/565, 567, 348/561, 580, 581, 564; 345/672, 681, 682, 781, 788, 799, 800, 801; H04N 5/45

(56) References Cited

U.S. PATENT DOCUMENTS

| | | | | |
|---|---|---|---|---|
| 4,574,364 A | * | 3/1986 | Tabata et al. | 345/798 |
| 4,751,507 A | * | 6/1988 | Hama et al. | 345/784 |
| 5,187,776 A | * | 2/1993 | Yanker | 345/800 |
| 5,283,561 A | | 2/1994 | Lumelsky et al. | 340/721 |
| 5,471,675 A | * | 11/1995 | Zias | 345/501 |
| 5,572,232 A | | 11/1996 | Rhodes et al. | 345/115 |
| 5,953,075 A | * | 9/1999 | Nagata et al. | 348/581 |

FOREIGN PATENT DOCUMENTS

| | | | | |
|---|---|---|---|---|
| EP | 0653742 A2 | 5/1995 | | |
| GB | 2 310 335 A | 8/1997 | | H04N/5/268 |
| WO | WO 94/13107 | 6/1994 | | H04N/7/16 |

* cited by examiner

*Primary Examiner*—Michael H. Lee
(74) *Attorney, Agent, or Firm*—Beyer Weaver & Thomas LLP (57) ABSTRACT

Methods and apparatus for creating and manipulating a video window on a display associated with a television are disclosed. A set of parameters identifying a source region and a destination location in a source coordinate system are obtained where the source coordinate system includes a source origin at a location of the source coordinate system. A destination origin is set at a location of a destination coordinate system. The source region is then translated to a location within the destination coordinate system equivalent to the destination location in the source coordinate system.

26 Claims, 10 Drawing Sheets

VIDEO COMPONENT / VIDEO COMPONENT API

METHODS AND APPARATUS FOR PROVIDING VIDEO CONTROL FOR TELEVISION APPLICATIONS

CROSS REFERENCE TO RELATED APPLICATIONS

This application claims priority of provisional U.S. patent application Ser. No. 60/143,428, filed Jul. 13, 1999, entitled "Java TV API Specification" which is incorporated by reference.

This application claims priority of provisional U.S. patent application Ser. No. 60/174,535, filed Jan. 5, 2000, entitled "Methods and Apparatus for Providing Video Control for Television Applications" which is incorporated by reference.

BACKGROUND OF THE INVENTION

1. Field of the Invention

The present invention relates generally to computer software. More particularly, the present invention relates to methods and apparatus for implementing a picture-in-picture capability within a digital television.

2. Description of the Related Art

The digital television revolution is one of the most significant events in the history of broadcast television. With the advent of digital television, high speed data transfer is possible via satellite, cable and terrestrial television channels. Digital television will offer users more channels as well as significantly improved video and audio quality. Most importantly, digital television ushers in the age of true interactive television. For instance, digital receivers will be able to offer users a variety of enhanced services, from simple interactive quiz shows, to Internet over the air, and a mix of television and web-type content. As the market for digital television grows, content developers are looking for a feature-rich, cost-effective, and reliable software platform upon which to build the next generation of interactive television services such as Electronic Programming Guides, Video-On-Demand, and Enhanced Broadcasting.

Picture-in-picture is a capability that is common to many televisions that are currently available. However, picture-in-picture functionality is typically implemented in hardware. As digital television technology matures, it would be desirable if picture-in-picture functionality were implemented in software.

In addition to the environment in which picture-in-picture functionality is implemented, the functionality of picture-in-picture capabilities has been limited. For instance, the picture-in-picture window is typically constrained to a predetermined location of the video monitor. Moreover, although a television viewer may wish to simultaneously view multiple channels, the capability of creating multiple picture-in-picture windows has not traditionally been available.

While picture-in-picture features are often important to consumers, equally as important is the compatibility of electronic devices supporting picture-in-picture functionality. In today's technologically advanced society, televisions are typically intended to be compatible with VCRs and remote controls manufactured by other companies. It is therefore common for VCRs and televisions manufactured by different companies to be used in combination with one another. As a result, the remote controls provided with these VCRs and televisions are often used interchangeably. Similarly, universal remote controls are also in common use. Although these remote controls are intended to be compatible with a variety of televisions, there is rarely a one-to-one mapping between the functionality supported by the remote controls and those provided by the different television manufacturers. Moreover, since there are a wide variety of choices available to today's consumer, it is impossible to predict the picture-in-picture capabilities of each television the remote control may be used with.

In view of the above, it would be desirable if it were possible to create a picture-in-picture window in a location selected by the television viewer. Moreover, it would be advantageous if the television viewer had the capability of creating multiple picture-in-picture windows. Finally, it would be desirable if these picture-in-picture functions could be implemented for use with any digital television that provides picture-in-picture functionality.

SUMMARY

The present invention provides methods and apparatus for implementing a video window (e.g., picture-in-picture window) on a display associated with a digital television. This is accomplished, in part, through an application programming interface providing a set of methods enabling a video window to be created as well as queried. In this manner, a video window may be translated as well as scaled according to user specified parameters.

According to one aspect of the invention, an application programming interface provides a set video window method enabling a video window to be created. The set video window method has a set of parameters indicating a source region of an image, a destination position, and a scale factor indicating an amount that the source region is to be scaled when translated to the destination position. The set video window method may then be called to translate and scale the source region when the set of parameters are specified.

According to another aspect of the invention, the application programming interface provides a second method enabling values associated with the set of parameters to be obtained after the set video window method has been called to create a video window.

According to yet another aspect of the invention, a video component object implementing the application programming interface may be obtained for each video window existing within a display. As one example, a video component object may be obtained for an underlying image. As another example, a video component object may be obtained for each picture-in-picture video window.

According to another aspect of the invention, the present invention implements translation and scaling functionality such that a video image may be translated and/or scaled in accordance with varying hardware capabilities. Thus, the set video window method may accommodate various picture-in-picture capabilities available on the market. For instance, the number of picture-in-picture windows allowed on a television as well as the permitted location of a picture-in-picture window may vary. In this manner, a remote control may provide picture-in-picture functionality that is compatible with a variety of existing as well as contemplated televisions.

According to yet another aspect of the invention, the present invention is implemented on a Java platform. The Java platform provides an ideal development and deployment platform for this emerging class of interactive services. The Java programming language provides content developers with a high degree of control and flexibility of the "look and feel" of their applications, enabling them to deliver the most dynamic and compelling interactive television experiences to their audience. In addition, interactive television applications written in the Java programming language offer security, extensibility, and portability across a diverse array of television receivers, saving content developers time and money getting their interactive applications to market.

The present invention enables a video window to be translated as well as scaled to accommodate a variety of televisions. This is particularly advantageous when used in a device such as a remote control. In this manner, a viewer may operate a remote control without requiring knowledge of the capabilities of the television which the remote control operates.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
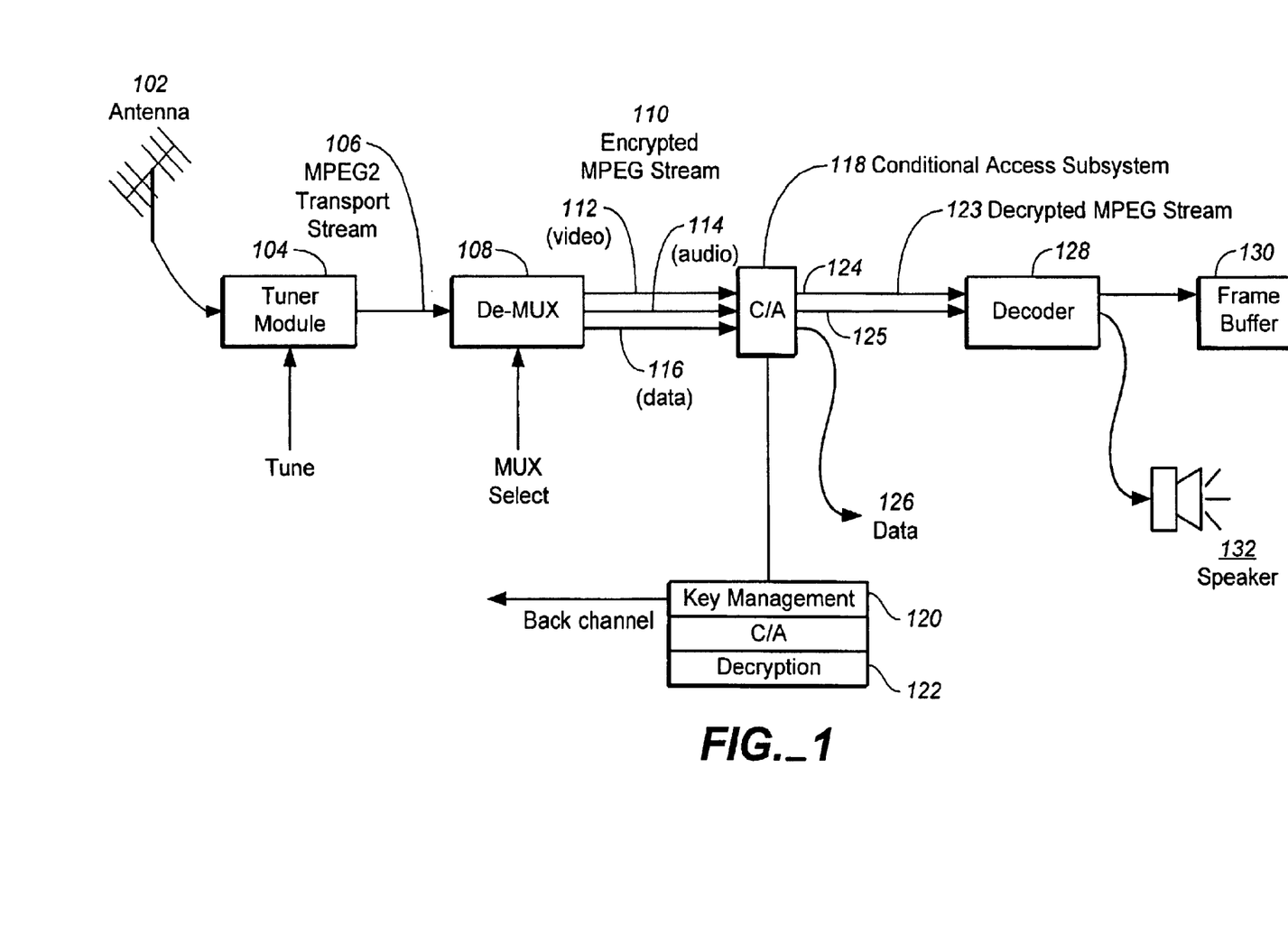
FIG. 1 is a block diagram illustrating an exemplary digital television receiver.

An invention is described herein that enables picture-in-picture functionality to be implemented in a system regardless of the hardware configuration of that system. More particularly, the invention described within enables an application to implement picture-in-picture functionality in a digital television environment. For example, the present invention may be used to manage the location and scaling of multiple video windows. FIG. 1 is a block diagram illustrating an exemplary digital television receiver. As shown in FIG. 1, a signal is received via antenna 102 and tuned by tuner module 104, producing MPEG2 transport stream 106. De-multiplexer 108 then produces encrypted MPEG stream 1 10 including a video stream 112, an audio stream 114, and a data stream 116. These three streams are then processed by conditional access subsystem 118. For instance, the conditional access subsystem 118 may utilize key management information 120 as well as decryption information 122 (e.g., decryption algorithms). The conditional access subsystem 118 produces decrypted MPEG streams 123 including a video stream 124 and audio stream 125 as well as data 126, all of which are decrypted. A decoder 128 then processes the decrypted MPEG stream 123, and forwards the decoded video data to frame buffer 130 and transmits the decoded audio data to speaker 132. When the data 126 is processed, it could contain Java applications that are composed of many classes. According to one embodiment, a Java application may be an application that is used to create one or more picture-in-picture windows in user-specified locations on a video monitor.

Figure 2:
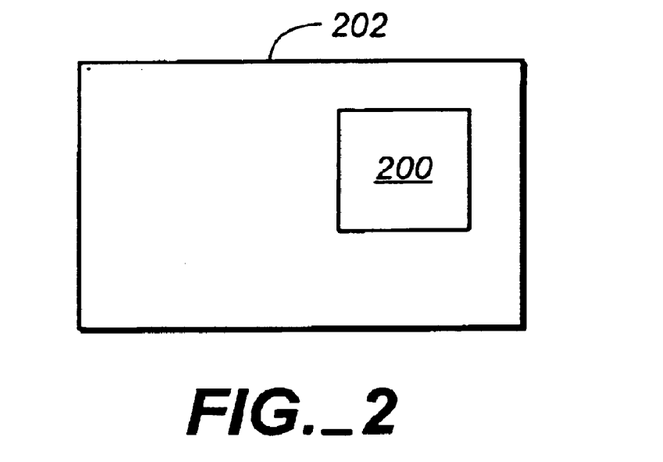
FIG. 2 is a block diagram illustrating the creation of a conventional picture-in-picture window on a television screen.

As described above, traditional picture-in-picture functionality is limited. FIG. 2 is a block diagram illustrating the creation of a conventional picture-in-picture window 200 on a television screen 202. This is typically performed by hardware which does not allow for a user to vary the position of the picture-in-picture window 200 within the television screen 202. Moreover, a television viewer typically has the option of creating only a single picture-in-picture window, and the window must consist of the entire video program. As will be described with reference to the following figures, the present invention provides a system for implementing picture-in-picture functions such as these within a digital television environment.

Figure 3:
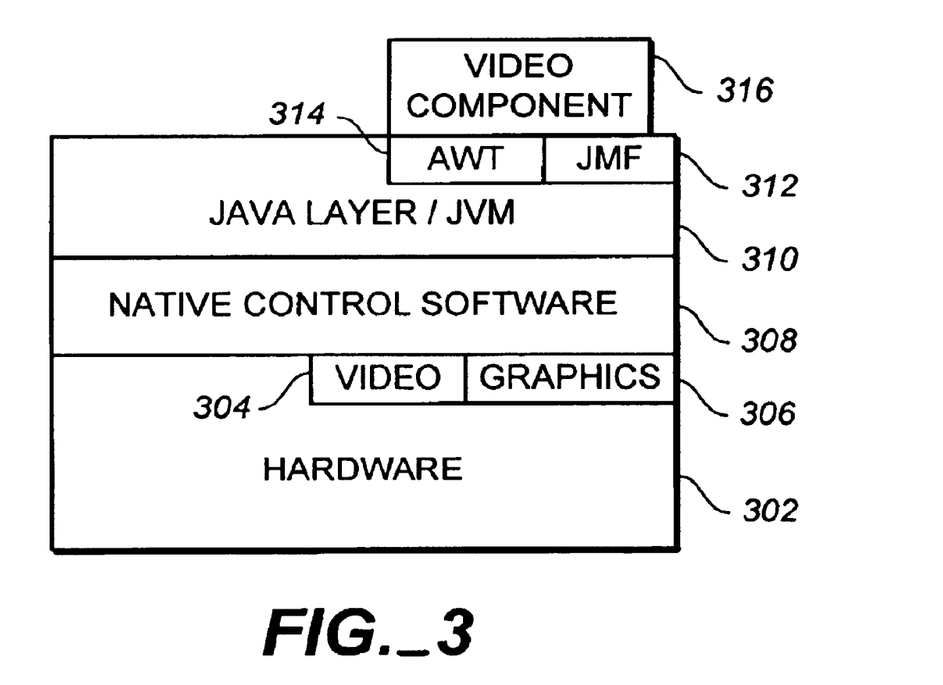
FIG. 3 is a block diagram illustrating a system in which the present invention may be implemented.

FIG. 3 is a block diagram illustrating a system in which the present invention may be implemented. As shown, the system includes hardware 302, including video hardware 304 and graphics hardware 306 hardware (e.g., frame buffer). In addition, native control software 308 which provides graphics signal processing capabilities for the particular hardware 302 in order to scale and bound the video.

Java is a leading commercial object-oriented language designed as a portable language that can run on any compatible device that supports the Java platform. As such, it offers great promise as the software platform for the next generation of set-top boxes and digital televisions.

A Java Virtual Machine (JVM) 310 is one platform that may be used to implement the present invention. As shown, Java Media Framework API (JMF) 312 enables the display and capture of multimedia data within Java applications and applets. The JMF 312 specifies a unified architecture, messaging protocol and programming interface for playback, capture and conferencing of compressed streaming and stored timed-based media including audio and video across all Java enabled platforms. For instance, the JMF 312 enables functions such as start, stop, and play functions.

In addition, Java Abstract Window Toolkit (AWT) 314 is included. The AWT 314 is a large collection of classes for building graphical user interfaces in Java. For instance, the AWT 314 provides the functionality to manage and control the display (e.g., keyboard, mouse, and menus). More particularly, the AWT 314 manages the display of one or more components, where each component is a collection of graphical elements that are treated as a whole. For instance, a component may be an image or a window. The JMF and AWT are described in further detail in "Essential JMF Java™ Java Media Framework," Rob Gordon and Stephen Talley, Prentice Hall 1999, ISBN 0-13-080104-6, and "The Java Class Libraries Volume 2," Second Edition, Patrick Chan and Rosanna Lee, Prentice Hall 1997, ISBN 0201310031, respectively, which are hereby incorporated by reference.

In addition to the above-described components, a video component 316 is disclosed. More particularly, the video component 316 is implemented through the instantiation of an object having an application programming interface disclosed herein. The video component 316 is described in further detail below with reference to FIG. 4.

Figure 4:
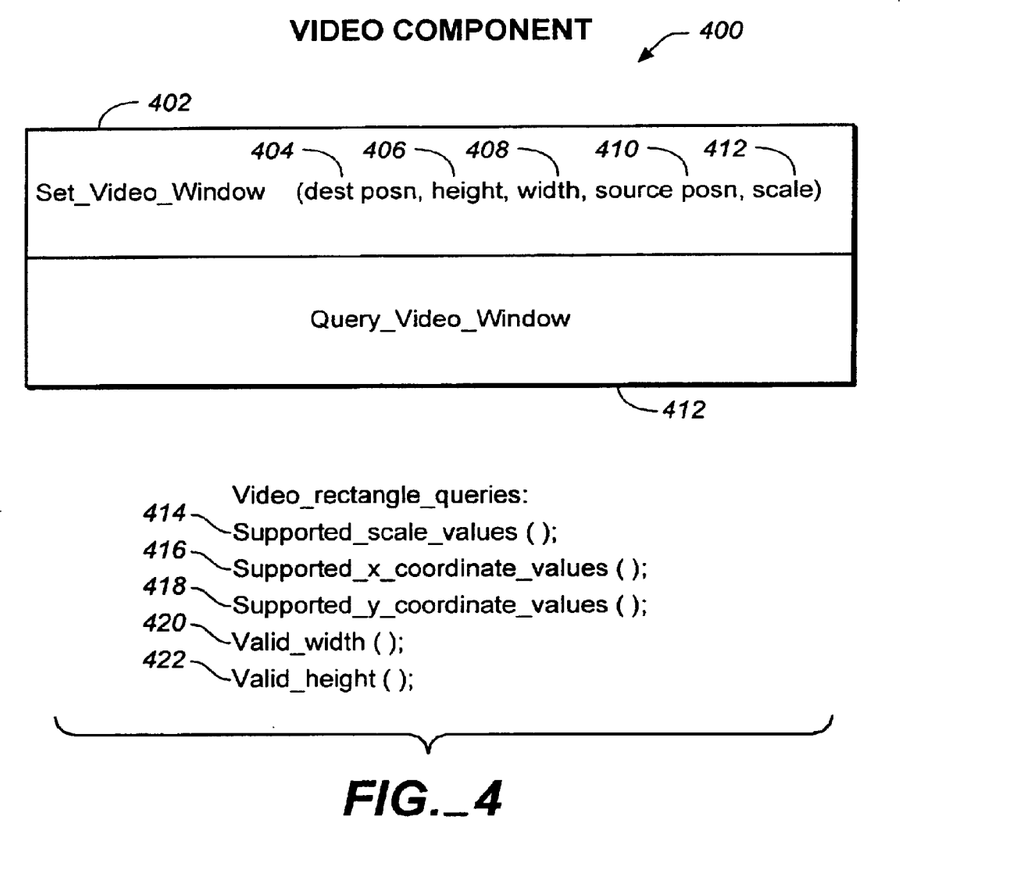
FIG. 4 is a diagram illustrating a video component implementing an application programming interface (API) according to one embodiment of the invention.

FIG. 4 is a diagram illustrating a video component implementing an application programming interface (API) according to one embodiment of the invention. As shown, video component 400 is a data structure (e.g., object) that enables picture-in-picture functionality to be implemented in a digital television environment. More particularly, this is accomplished through implementing an application programming interface including two methods which enable a video window (e.g., picture-in-picture window) to be created as well as queried to determine the attributes of the created video window.

When a television viewer selects a picture-in-picture function, the television viewer may select a "source rectangle" within an image through a mouse or other inputs. For instance, the television viewer may select the height, width, and position of the source rectangle through numerical inputs on a keyboard or remote control. A corresponding video window may then be created through a set video window method 402. The set video window method 402 enables a video image having bounds specified by a height 406 and a width 408 measured from a source position 410 to be scaled according to a specified scale factor 412 and displayed at a destination position 404. Both the source position 410 and the destination position 404 may be specified through an x-coordinate and a y-coordinate. Through the specification of the height 406, the width 408, and the source position 410, a source rectangle may be specified in a source coordinate system. The destination position 404 specifies a location in a destination coordinate system at which a destination rectangle is to be placed once the source rectangle is scaled by the scale factor 412. Thus, through the use of the set video window method 402, a video window is created.

Once a video window is created, it may be desirable to ascertain various attributes of the video window. For instance, it may be desirable to determine the location (e.g., destination position), height, width, or scale factor. This may be advantageous, for instance, to determine whether a region is occupied by a video window or whether a further video window may be placed within this region. For this purpose, a query video window method 412 can determine features of a video window, such as its position or scale factor. This may be accomplished, for example, by returning a video component object from a set of one or more video component objects. Accordingly, the use of the API enables picture-in-picture functionality to be implemented in a digital television environment independent of the underlying hardware.

Rather than querying attributes of a video window after creation of the video window, it may also be desirable to query possible values prior to setting a video window. For this purpose, a set of methods are provided for implementing video rectangle queries. The set of methods may be implemented for both source and destination coordinate systems. Alternatively, a separate set of methods may be implemented for each of the source and destination coordinate systems. As shown, a supported scale values method 414 may be used to determine those scale values that are supported by the underlying coordinate system. In addition, a supported x coordinate values method 416 may be used to determine those x coordinate values that are supported by the underlying coordinate system. Similarly, a supported y coordinate values method 418 may be used to determine those y coordinate values that are supported by the underlying coordinate system. Moreover, a valid width method 420 and valid height method 422 may be used to determine valid widths and heights for a selected source rectangle as the chosen video window to translate and scale.

An equivalent application of the invention would provide the methods of the API described in FIG. 4 on an object separate but related to the video component. This would require that whatever mechanism is used to instantiate the video component would also be capable of instantiating the object that implements the methods in FIG. 4 as well as relating that object to the original video component. One way of doing this would be to use a JMF Player object. The JMF Player object includes a method (getVisualComponent) that provides access to the video component and a method (getControls) that provides objects related to the video component that control the presentation of video data. An application would instantiate the video component using the getVisualComponent method and obtain the object implementing the API described in FIG. 4 from the getControls method.

Figure 5:
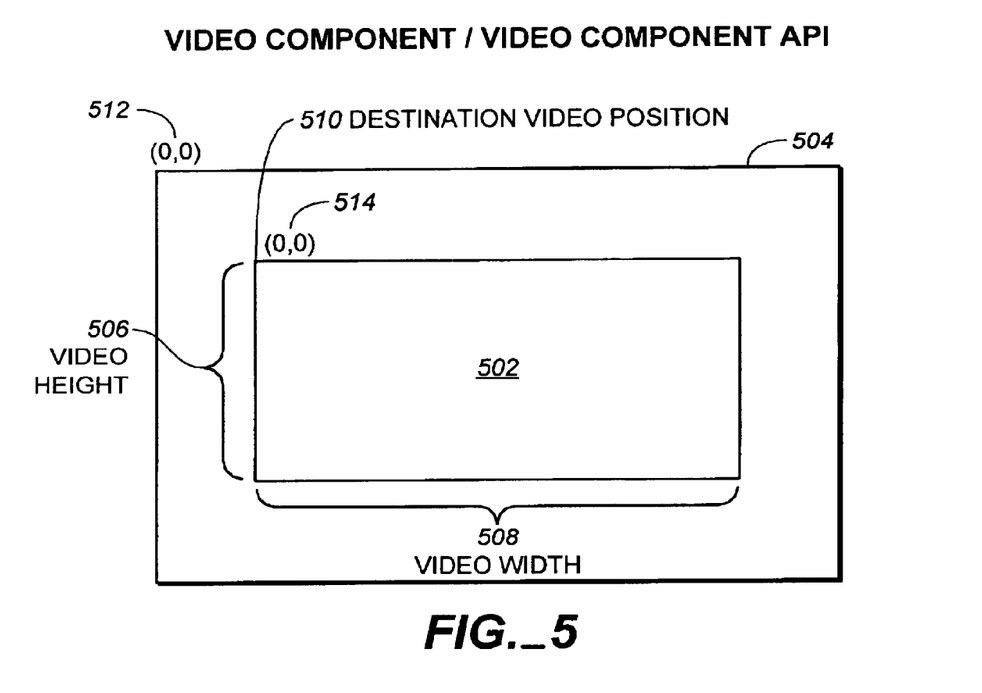
FIG. 5 is a diagram illustrating a video window display associated with a video component according to one embodiment of the invention.

As described above, the video component 400 enables a video window to be set as well as queried. FIG. 5 is a diagram illustrating a video window display associated with a video component according to one embodiment of the invention. As shown, once the set video window method is called, a video window 502 is displayed on an underlying video image 504. The video window 502 has a video height 506 and video width 508, both of which have been scaled according to a scale factor, and displayed at a destination video position 510.

In order to apply the same methods to each video window (e.g., underlying video image or picture-in-picture window), an origin is set at a standard location. According to one embodiment, the origin is set at an upper left-hand corner of each coordinate system. For instance, the origin in the source coordinate system may be set as shown at 512. Once the set video window method is called to translate and scale the selected source rectangle, a destination coordinate system is created in which the origin of the destination coordinate system is set at the same location as the origin of the source coordinate system. For instance, the origin in the destination coordinate system may be set in the upper left hand corner, as shown at 514.

Figure 6:
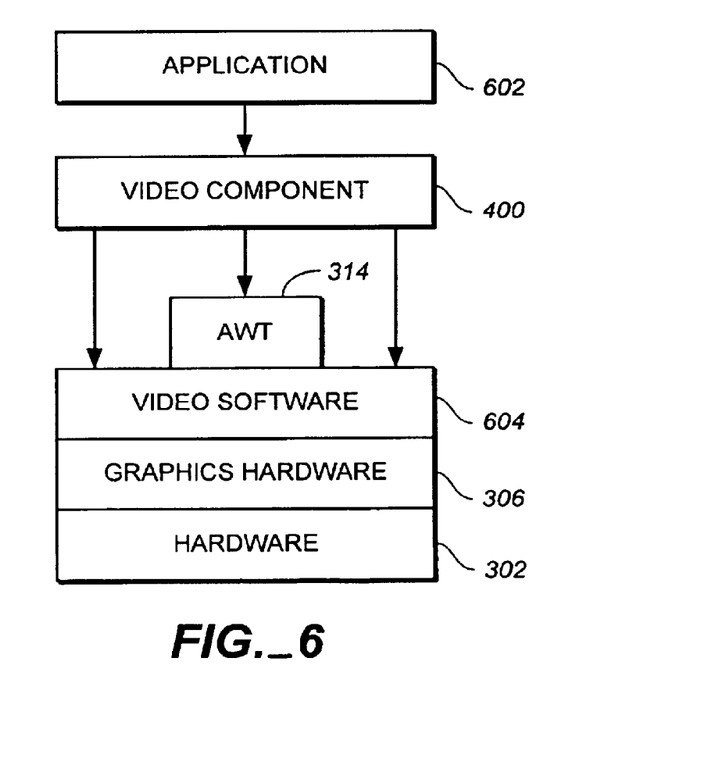
FIG. 6 is a block diagram illustrating an exemplary system in which a video component may be implemented.

An application that implements the above-described methods through an instantiated video component object may be implemented in a variety of devices, such as a remote control. Thus, once a video component is instantiated, an application may translate and scale a video window as well as query the parameters of that video window through the video component object. FIG. 6 is a block diagram illustrating an exemplary system in which a video component may be implemented. As shown, the system includes the hardware 302, the graphics hardware 306, the AWT 314, and the video component 400. An application 602 may obtain a video component object 400 to set a video window or query a video window. More particularly, the video component object 400 may perform these functions via video software 604 as well as the AWT 314. Through the instantiation of one or more of one or more video windows within a single video monitor. One or more video component objects may be instantiated to provide one or more video windows. Accordingly, the application 602 may obtain multiple video components 400, either simultaneously or sequentially to set up multiple video windows within a single monitor.

Figure 7:
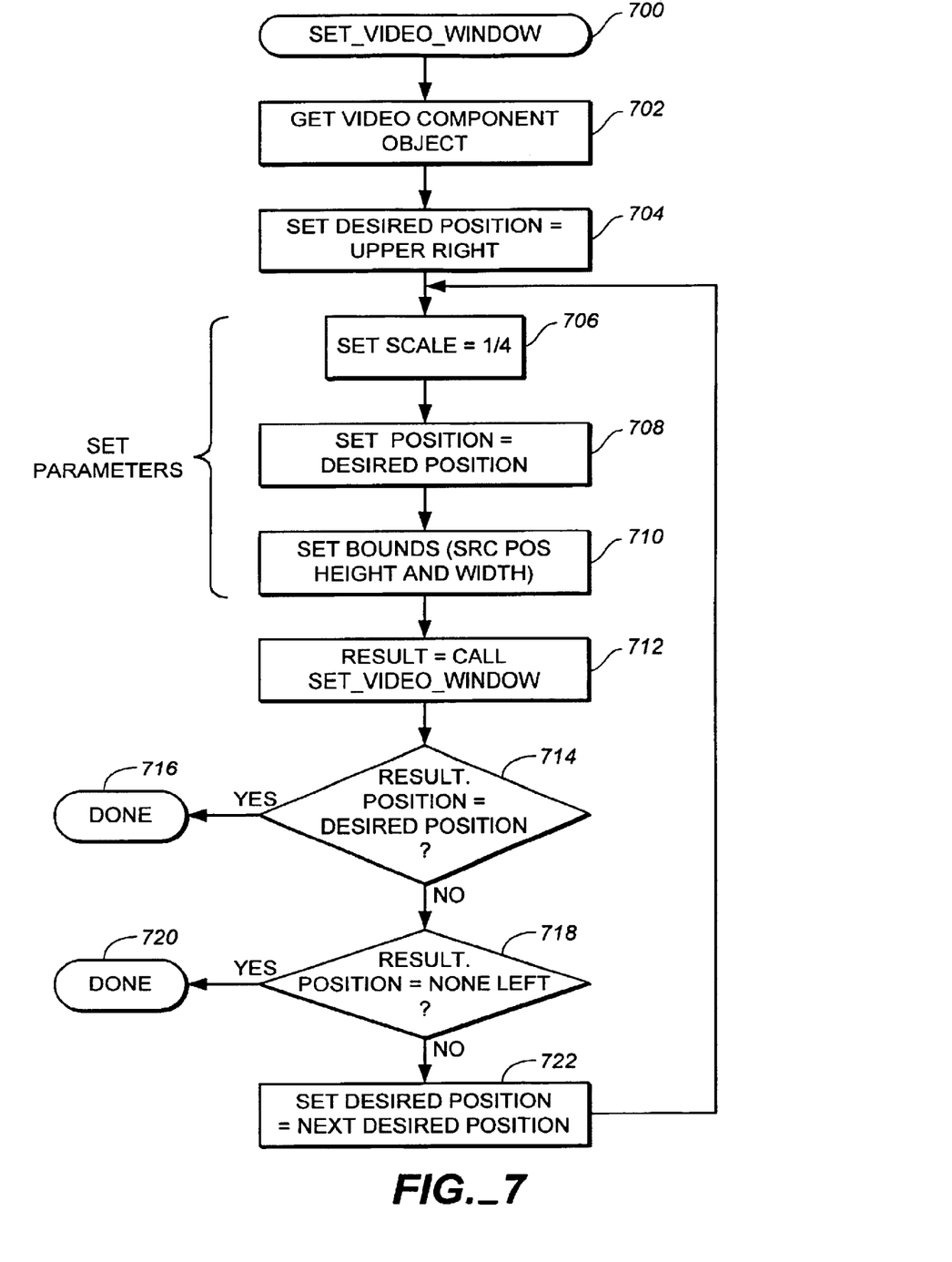
FIG. 7 is a process flow diagram illustrating one method of creating a video window by calling the set video window method.

As described above with reference to FIG. 4, the video component object 400 enables both the set video window method 402 and the query video window method 412 to be called by an application. FIG. 7 is a process flow diagram illustrating one method of creating a video window by calling the set video window method. The process begins at block 700 and at block 702 a video component object is obtained. For instance the video component object may be selected from one or more video component objects that have previously been instantiated. A user (e.g., television viewer) may then select or enter parameters to define the source and destination regions (e.g., rectangles) associated with a video window (e.g., picture-in-picture window) to be displayed. The parameters are then set as shown at blocks 704–710. At block 704 a desired position for the destination region is set to the selected region (e.g., upper right quadrant) of the monitor. A scale factor is then set to the selected scale factor at block 706. For instance, the scale factor associated with the destination region may be specified to be one-fourth-of the size and dimensions of the source region. The position parameter of the set video window method is then set to the desired position at block 708. The source region is then specified at block 710. For instance the bounds of the source region may be set by specifying a source position, a height, and a width.

Once the parameters of the set video window method are specified, the set video window method is then called at block 712. Since the application calling the set video window method may be separate from the hardware implementing the picture-in-picture functionality, the parameters as specified by the user may not ultimately be within the capabilities of the hardware. For instance, a universal remote control may enable a picture-in-picture to be located in any position of the screen and allow any scale factor. However, a television with which the universal remote control is used may only enable a picture-in-picture window to be created in specific locations (e.g., lower left-hand corner of the screen). Similarly, the television may only support specific scale factors (e.g., one-half, one-fourth). Therefore, according to one embodiment, the set video window method returns an object (e.g., video component object) having the values as ultimately set by the set video window method. At block 714, if the resulting position of the window is determined to be equal to the desired position, the process ends at block 716. If the resulting position is not equal to the desired position, the hardware cannot support the desired position or the desired position is currently occupied. Thus, it is next determined at block 718 whether the resulting position indicates that there are no further positions in which to display a further video window. If there are no further positions, the process ends at block 720 and the video window is not displayed. However, if there are further positions in which the video window may be displayed, the desired position is set to another position at block 722. For instance, the position may be arbitrarily selected among a set of possible positions or the television viewer may select another desired position. The process then continues at block 706 for the newly selected desired position.

In addition to verifying that the resulting position is equal to the desired position, other parameters may similarly be verified. For instance, the hardware may support only specific scale factors. Therefore, it may be determined (e.g., at block 714) whether the resulting scale factor is equaled to the selected scale factor. These examples are merely illustrative, and other selections may similarly be verified by the values in the returned video component object.

Figure 8:
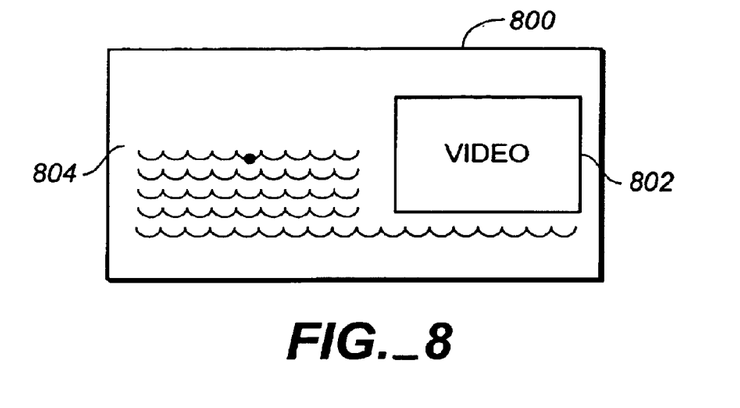
FIG. 8 illustrates a karaoke application of the present invention.

Once a video window is created and displayed, it may be desirable for a variety of reasons to query the parameter values of the video window. For instance, FIG. 8 illustrates a karaoke application of the present invention. Within a monitor 800, a video window 802 is displayed. If a television viewer decides to watch a music channel in which a karaoke option is offered, it may be necessary to determine where the video window 802 is located in order to appropriately display the associated lyrics 804.

Figure 9:
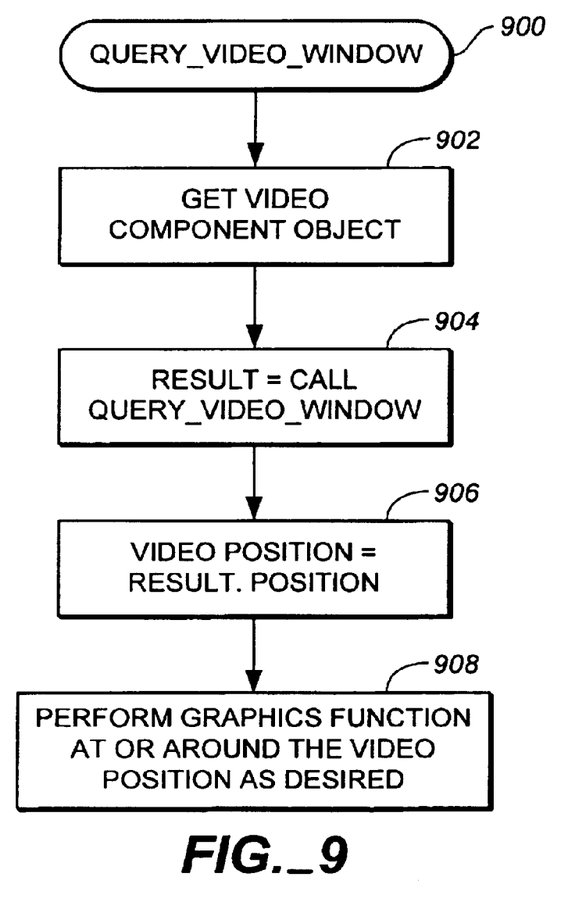
FIG. 9 is a process flow diagram illustrating one method of determining parameters associated with an existing video window.

FIG. 9 is a process flow diagram illustrating one method of determining parameters associated with an existing video window. The process begins at block 900 and at block 902, a video component object is obtained from a set of one or more video component objects. For instance, a video component object may be associated with each picture-in-picture window as well as any underlying image. Moreover, multiple picture-in-picture windows may be supported by some systems. Once the video component object is obtained, the query video window method shown above with reference to FIG. 4 is called at block 904. According to one embodiment, the query video window method returns an object specifying the parameters of the video window associated with the video component object. The position at which the video window is located is then obtained from this returned object at block 906. Once the position of the existing video window is obtained, a graphics function may be performed at or around the video position as desired at block 908. As one example, the query video window method may be used to optimize the picture-in-picture functionality so that the picture-in-picture window is only displayed at a particular location if it does not already exist in that location. As another example, the query video window method may be used to determine whether a picture-in-picture window exists in a location in which a second picture-in-picture window is desired. Finally, as described above with reference to FIG. 8, the query video window method may be used to determine a region in a karaoke application in which lyrics may be displayed.

Figure 10:
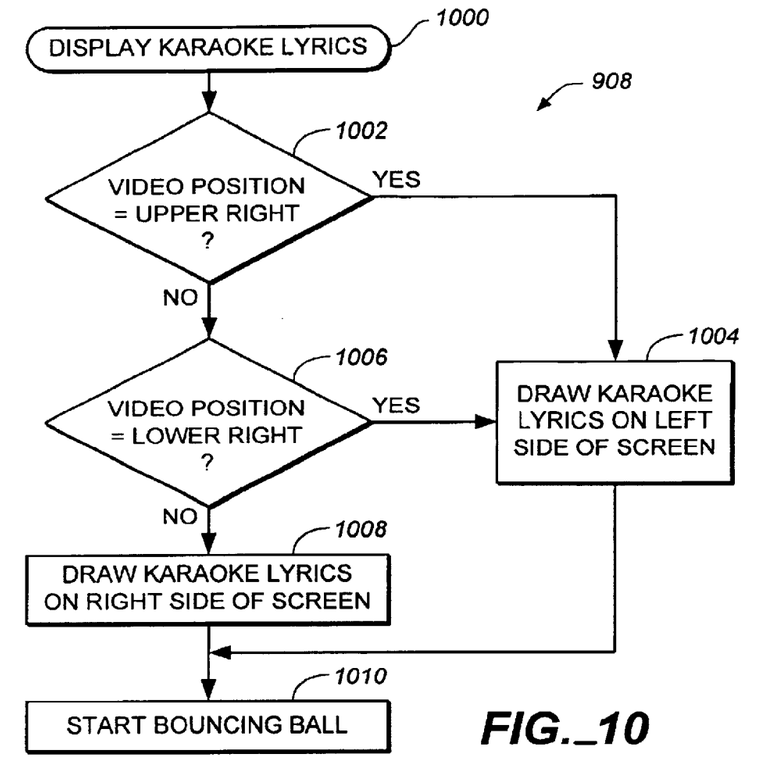
FIG. 10 is a process flow diagram illustrating an exemplary method of displaying karaoke lyrics at block 908 of FIG. 9.

FIG. 10 is a process flow diagram illustrating an exemplary method of displaying karaoke lyrics at block 908 of FIG. 9. The process begins at block 1000. It is determined at block 1002 whether the position at which the video window is located is the upper right quadrant of the screen. If the video window is displayed in the upper right quadrant of the screen, the karaoke lyrics are displayed on the left side of the screen at block 1004. However, if the position indicates that the video window is not located in the upper right quadrant of the screen, it is next determined whether the video window is located in the lower right quadrant of the screen at block 1006. If video window is not in the lower right quadrant, the video window must be located in the left side of the screen. The karaoke lyrics are therefore drawn on the right side of the screen at block 1008. Once the lyrics are displayed, the bouncing ball is displayed at block 1010 along with the music as appropriate. Although the above-described process checks left and right-hand sides of a screen, further and more complicated methods may be implemented to display karaoke lyrics or other graphical elements around one or more video windows.

Figure 11:
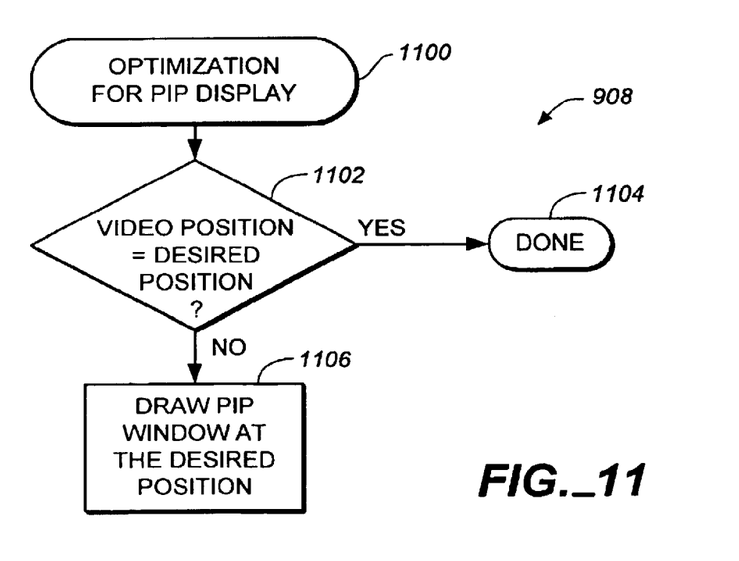
FIG. 11 is a process flow diagram illustrating one method of optimizing the picture-in-picture functionality at block 908 of FIG. 9.

As described above, the query video window method may also be used to optimize the picture-in-picture display. FIG. 11 is a process flow diagram illustrating one method of optimizing the picture-in-picture functionality at block 908 of FIG. 9. The process begins at block 1100 and at block 1102 it is determined whether the position of the video window is located at the desired position. If the position is located at the desired position, the video window need not be drawn and the process ends at block 1104. However, if the video window is not located at the desired position, the video window is drawn at the desired position at block 1106. In this manner, picture-in-picture functionality may be optimized.

Figure 12:
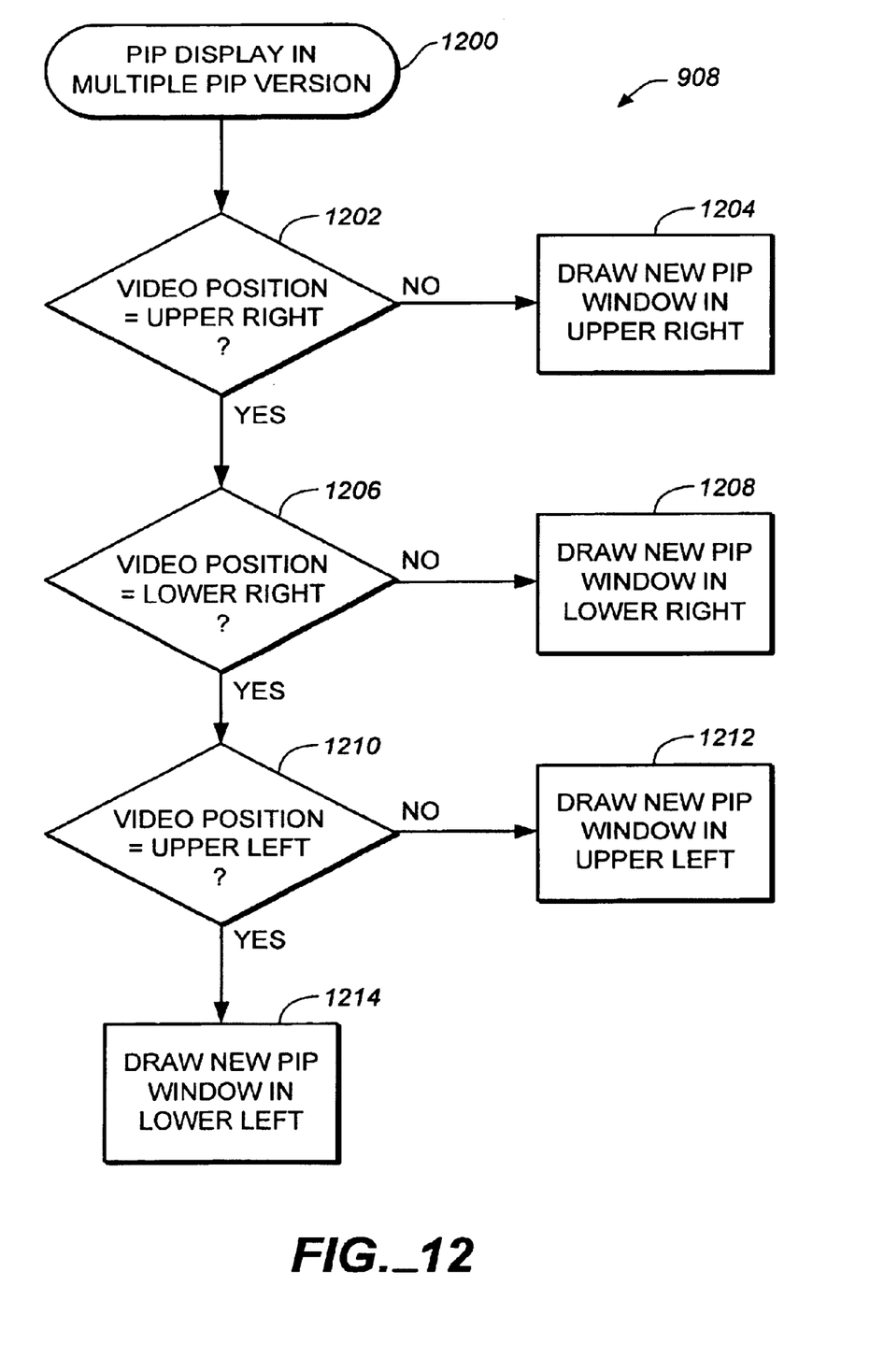
FIG. 12 is a process flow diagram illustrating one method of applying the querying function to display multiple picture-in-picture video windows at block 908 of FIG. 9.

The query video method may also be applied to implement picture-in-picture display in systems supporting multiple picture-in-picture video windows. FIG. 12 is a process flow diagram illustrating one method of applying the querying function to display multiple picture-in-picture video windows at block 908 of FIG. 9. The process begins at block 1200 and at block 1202, it is determined whether the position of the existing video window indicates that the existing video window is located in the upper right quadrant of the screen. If the position indicates that the existing video window is not displayed in the upper right quadrant of the screen, a new video window may be drawn in the upper right quadrant at block 1204. However, if the existing video window is not displayed in the upper right quadrant, it is determined whether the position of the existing video window is within the lower right quadrant of the screen at block 1206. If the existing video window is not within the lower right quadrant, the new video window may be drawn in the lower right quadrant at block 1208. It is next determined at block 1210 whether the existing video window is displayed within the upper left quadrant of the screen. If the existing video window is not located within the upper left quadrant, the new video window may be displayed in the upper left quadrant at block 1212. Otherwise, if the existing video window is located in the upper left quadrant, the new video window is displayed in the lower left quadrant at block 1214. In this manner, one or more video windows (e.g., picture-in-picture windows) may be displayed so that they do not overlap. Although the above-described process presents a simplified method of displaying multiple picture-in-picture windows, the process is merely illustrative and other positions within a screen may be checked and compared with specified parameters (e.g., positions) associated with one or more additional video window requests.

Figure 13:
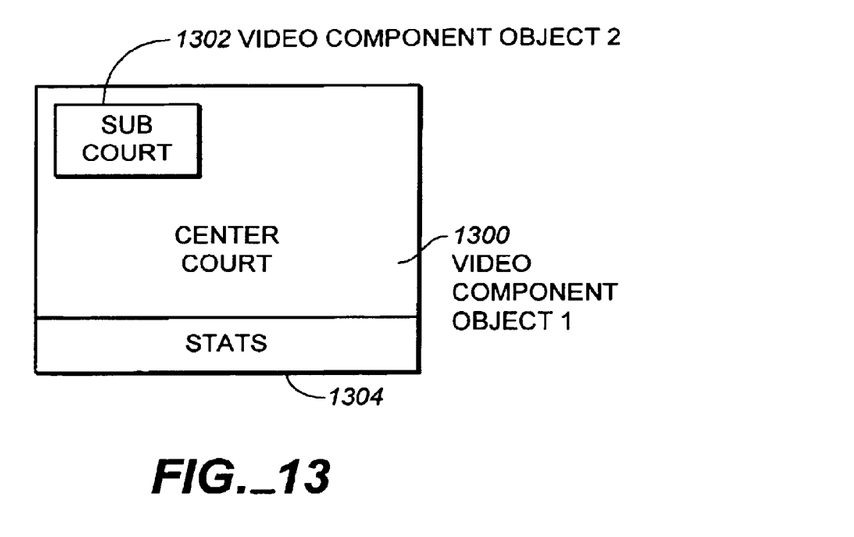
FIG. 13 is a diagram illustrating the use of multiple video component objects within a system supporting a single picture-in-picture window.

Multiple video component objects such as that presented in FIG. 4 may be instantiated for use within a system that supports a single picture-in-picture windows. FIG. 13 is a diagram illustrating the use of multiple video component objects within a system supporting a single picture-in-picture window. As shown, a first video component may be associated with an underlying video window 1300 or image while a second video component object may be associated with a second video window (e.g., picture-in-picture window) 1302. For instance, a television viewer may wish to view a tennis game in which the center court is displayed as the underlying video window 1300 and the sub court is viewed as the picture-in-picture window 1302. Moreover, statistics may be displayed in a further text window 1304. The system may further enable a user to substitute the underlying video window 1300 with the picture-in-picture window 1302. Therefore, the video components may be associated with different windows and parameters in response to this substitution.

Figure 14:
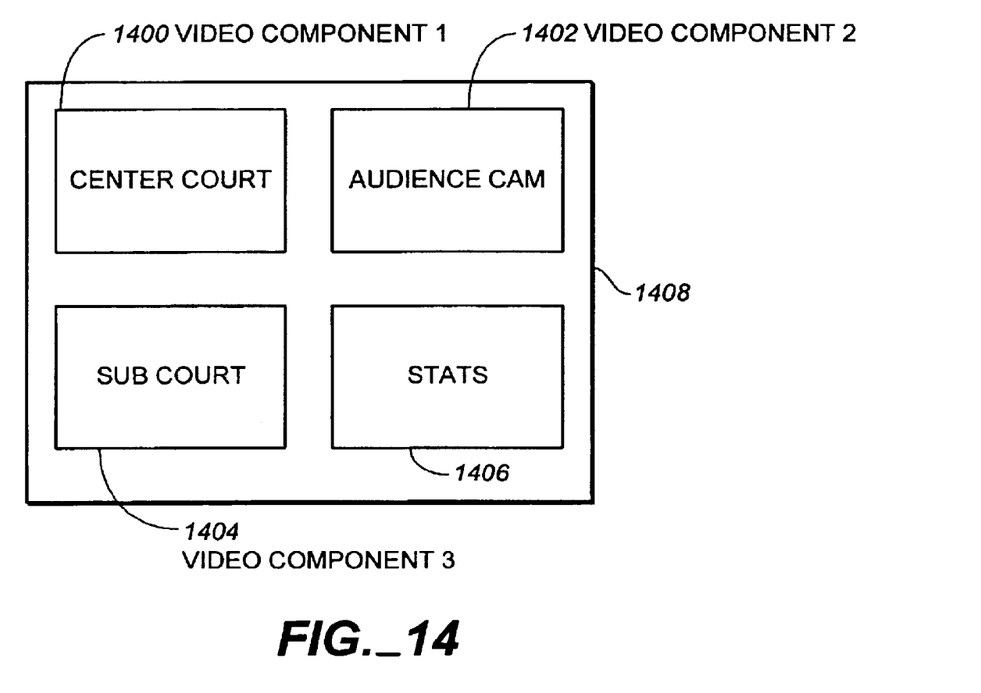
FIG. 14 is a diagram illustrating the use of multiple video component objects within a system that supports multiple picture-in-picture windows.

Similarly, multiple video component objects may be instantiated for use within a system that supports multiple picture-in-picture windows. FIG. 14 is a diagram illustrating the use of multiple video component objects within a system that supports multiple picture-in-picture windows. Thus, a first video component 1400 may be associated with a first picture-in-picture window, a second video component 1402 may be associated with a second picture-in-picture window, and a third video component 1404 may be associated with a third picture-in-picture window. For instance, as described above with reference to FIG. 13, a television viewer may wish to view multiple picture-in-picture windows while watching a game such as a tennis match. Thus, as shown, the first video component 1400 may be used to display the center court, the second video component 1402 may be used to display an audience cam, and the third video component 1404 may be used to display the sub court. In addition, a further text window 1406 may be used to display statistics such as the score. Moreover, an underlying image 1408 may display the entire game from which the viewer has selected regions to display in the multiple picture-in-picture windows.

The present invention provides methods and apparatus for implementing picture-in-picture functionality without requiring knowledge of the capabilities of the hardware providing the picture-in-picture functionality. An application programming interface enables a video window to be created as well as created. Moreover, through the instantiation of a video component object having the disclosed application-programming interface, one or more video windows may be specified and displayed. In addition, a set of querying functions are disclosed to enable a set of features of a video window such as a position and dimensions of the video window to be ascertained.

Figure 15:
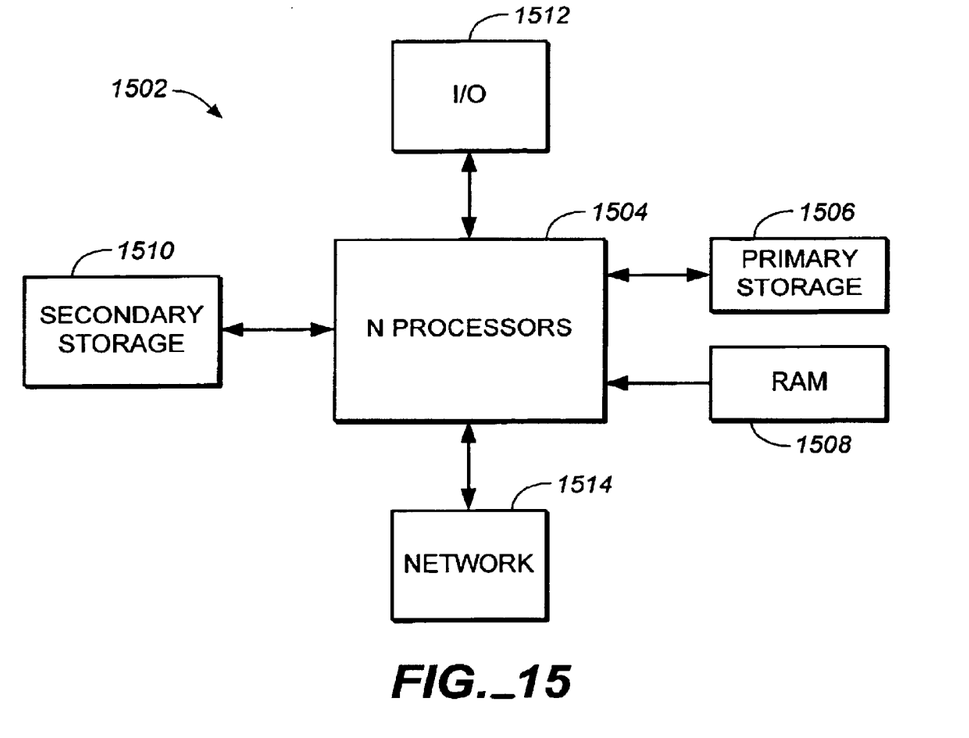
FIG. 15 illustrates a typical, general-purpose computer system suitable for implementing the present invention.

The present invention may be implemented on any suitable computer system. FIG. 15 illustrates a typical, general-purpose computer system 1502 suitable for implementing the present invention. The computer system may take any suitable form. For example, the computer system may be integrated with a digital television receiver or set top box.

Computer system 1530 or, more specifically, CPUs 1532, may be arranged to support a virtual machine, as will be appreciated by those skilled in the art. The computer system 1502 includes any number of processors 1504 (also referred to as central processing units, or CPUs) that may be coupled to memory devices including primary storage device 1506 (typically a read only memory, or ROM) and primary storage device 1508 (typically a random access memory, or RAM). As is well known in the art, ROM acts to transfer data and instructions uni-directionally to the CPUs 1504, while RAM is used typically to transfer data and instructions in a bidirectional manner. Both the primary storage devices 1506, 1508 may include any suitable computer-readable media. The CPUs 1504 may generally include any number of processors.

A secondary storage medium 1510, which is typically a mass memory device, may also be coupled bi-directionally to CPUs 1504 and provides additional data storage capacity. The mass memory device 1510 is a computer-readable medium that may be used to store programs including computer code, data, and the like. Typically, the mass memory device 1510 is a storage medium such as a hard disk which is generally slower than primary storage devices 1506, 1508.

The CPUs 1504 may also be coupled to one or more input/output devices 1512 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPUs 1504 optionally may be coupled to a computer or telecommunications network, e.g., an internet network or an intranet network, using a network connection as shown generally at 1514. With such a network connection, it is contemplated that the CPUs 1504 might receive information from the network, or might output information to the network in the course of performing the above-described method steps. Such information, which is often represented as a sequence of instructions to be executed using the CPUs 1504, may be received from and outputted to the network, for example, in the form of a computer data signal embodied in a carrier wave.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as enabling picture-in-picture functionality in any system regardless of the hardware configuration of the system. Although the video component object is defined as including two methods, these methods are merely illustrative and therefore alternative embodiments are possible. Moreover, although the present invention is described as being implemented within a digital television environment, other applications are possible. Furthermore, although the present invention is described as being implemented on a Java platform, it may also be implemented on a variety of platforms or contexts in which object-oriented languages are used. Accordingly, the present embodiments are to be considered as illustrative and not restrictive, and the invention is not to be limited to the details given herein, but may be modified within the scope and equivalents of the appended claims.

What is claimed is:

1. A method of creating a video window on a display associated with a television, comprising:
    obtaining an object having an interface including a first method enabling a video window to be created, the first method having a set of parameters indicating a source region of an image, a destination position, and a scale factor indicating an amount that the source region is to be scaled when translated to the destination position; and
    calling the first method in response to a specification of the set of parameters such that a video window is created with the set of parameters when the video window generated at the destination position and according to the scale factor is within the capabilities of the television and the display.

2. The method as recited in claim 1, wherein obtaining the object comprises obtaining the object from one or more objects associated with one or more video window requests.

3. The method as recited in claim 1, wherein the first method scales and translates the source region to the destination position when the destination region is not occupied by a picture-in-picture window.

4. The method as recited in claim 1, wherein the first method scales and translates the source region to the destination position when the scale factor is supported by the television.

5. The method as recited in claim 1, wherein the first method scales and translates the source region to the destination position when the destination position is supported by the television.

6. The method as recited in claim 1, wherein the source region is identified by a height, a width, and a source position.

7. The method as recited in claim 1, wherein the interface further includes a second method enabling values associated with the set of parameters to be obtained.

8. The method as recited in claim 7, further including:
    calling the second method in response to a user selection.

9. A method of manipulating a video window on a display associated with a television, comprising:
    receiving a set of parameters indicating a source region of an image, a destination position, and a scale factor indicating an amount that the source region is to be scaled when translated to the destination position, the source region having a set of dimensions; and
    attempting to translate the source region of the image to the destination position and to apply the scale factor to the set of dimensions of the source region such that the set of dimensions of the source region are modified such that a video window including the translated and scaled source region is generated when the video window generated at the destination position and according to the scale factor is within the capabilities of the television and the display.

10. The method as recited in claim 9, further comprising:
    automatically applying another scale factor to the set of dimensions of the source region when attempting to apply the scale factor to the set of dimensions of the source region is unsuccessful.

11. The method as recited in claim 9, further comprising:
    obtaining a second scale factor when attempting to apply the scale factor to the set of dimensions of the source region is unsuccessful; and
    attempting to apply the second scale factor to the set of dimensions.

12. A method of creating a video window on a display associated with a television, comprising:
    receiving a set of parameters from a user indicating a source region of an image and a first destination position to which the source region is to be translated, the source region having a set of dimensions; and
    attempting to translate the source region to the first destination position such that a video window including the translated source region is generated when the translation of the source region to the destination position is within the capabilities of the television and the display.

13. The method as recited in claim 12, further comprising:
    obtaining a second destination position when attempting to translate the source region to the first destination position is unsuccessful; and
    attempting to translate the source region to the second destination position.

14. A method of creating a video window on a display associated with a television, comprising:

ascertaining a scale factor to be used in the generation of a video window, translating a region of an image from a source position to a destination position in accordance with the scale factor such that a first video window is generated at the destination position, the region having a first set of dimensions when at the source position and the first video window including a scaled region having a second set of dimensions when at the destination position; and performing a query to ascertain at least one of the destination position of the first video window and the second set of dimensions of the first video window.

15. The method as recited in claim 14, wherein performing a query comprises:

obtaining an object specifying the destination position and the second set of dimensions.

16. The method as recited in claim 14, further comprising:

displaying one or more graphical elements at one or more positions around the region located at the destination position and defined by the second set of dimensions.

17. The method as recited in claim 16, wherein the one or more graphical elements form one or more words.

18. The method as recited In claim 14, further comprising:

translating a second region of the image from a second source position to a second destination position when the second region does not overlap the first video window including the region located at the destination position and having the second set of dimensions.

19. The method as recited in claim 14, further comprising:

translating the region from the source position to the destination position when the first video window including the region is not located at the destination position.

20. A method of creating a video window on a display associated with a television, comprising:

obtaining a set of parameters identifying a source region and a destination location in a source coordinate system, the source coordinate system having a source origin at a location of the source coordinate system;

setting a destination origin at a location of a destination coordinate system; and translating the source region to a location within the destination coordinate system equivalent to the destination location in the source coordinate system when the translation of the source region to the location within the destination coordinate system is within the capabilities of the television and the display.

21. The method as recited in claim 20, wherein the set of parameters further includes a scale factor, the method further comprising:

applying the scale factor to the source region.

22. An apparatus for creating a video window on a display associated with a television, comprising:

a processor; and a memory having instructions stored therein, the instructions including:

instructions for receiving a set of parameters indicating a source region of an image, a destination position, and a scale factor indicating an amount that the source region is to be scaled when translated to the destination position, the source region having a set of dimensions;

instructions for attempting to translate the source region of the image to the destination position and to apply the scale factor to the set of dimensions of the source region such that the set of dimensions of the source region are modified such that a video window including the translated and scaled source region is generated when the video window generated at the destination position and according to the scale factor is within the capabilities of the television and the display; and instructions for determining one or more scale factors supported by the television, each of the one or more scale factors identifying an amount that a region located at a location of an image provided on the display may be scaled.

23. The apparatus as recited in claim 22, the memory further comprising:

instructions for determining a set of allowable dimensions for the region located at the location of the image.

24. The apparatus as recited in claim 22, the memory further comprising:

instructions for determining x-coordinate values and y-coordinate values supported by the television.

25. The apparatus as recited in claim 22, the memory further comprising:

instructions for selecting one of the one or more scale factors; and instructions for applying the selected one of the one or more scale factors to the region of the image.

26. An apparatus for creating a video window on a display associated with a television, comprising:

a processor; and a memory, at least one of the processor and the memory being adapted for:

obtaining an object having an interface including a first method enabling a video window to be created, the first method having a set of parameters indicating a source region of an image, a destination position, and a scale factor indicating an amount that the source region is to be scaled prior to being translated to the destination position; and calling the first method in response to a specification of the set of parameters such that a video window is created with the set of parameters when the video window generated at the destination position and according to the scale factor is within the capabilities of the television and the display.

* * * * *